(12) United States Patent
Bhatnagar et al.

(10) Patent No.: US 11,654,908 B2
(45) Date of Patent: May 23, 2023

(54) VEHICLE LANE-BASED CONTROL

(71) Applicant: Ford Global Technologies, LLC, Dearborn, MI (US)

(72) Inventors: Shalabh Rakesh Bhatnagar, Farmington Hills, MI (US); Nitendra Nath, Troy, MI (US); Amey Yogesh Karnik, Canton, MI (US); Jigarkumar Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 249 days.

(21) Appl. No.: 16/883,451

(22) Filed: May 26, 2020

(65) Prior Publication Data
US 2021/0370936 A1 Dec. 2, 2021

(51) Int. Cl.
*B60W 30/16* (2020.01)
*B60W 40/072* (2012.01)
*B60W 30/12* (2020.01)
*G08G 1/01* (2006.01)
*G08G 1/0967* (2006.01)

(52) U.S. Cl.
CPC ............ *B60W 30/16* (2013.01); *B60W 30/12* (2013.01); *B60W 40/072* (2013.01); *G08G 1/012* (2013.01); *G08G 1/096725* (2013.01); *B60W 2420/42* (2013.01); *B60W 2420/52* (2013.01); *B60W 2552/05* (2020.02)

(58) Field of Classification Search
CPC .... B60W 30/16; B60W 30/12; B60W 40/072; B60W 2552/05; B60W 2420/42; B60W 2420/52; G08G 1/012; G08G 1/096725
See application file for complete search history.

(56) References Cited

U.S. PATENT DOCUMENTS

| | | | |
|---|---|---|---|
| 9,470,537 B2 | 10/2016 | Raghu et al. | |
| 9,830,517 B2 | 11/2017 | Vladimerou et al. | |
| 10,204,277 B2 | 2/2019 | Kushida et al. | |
| 11,256,254 B2* | 2/2022 | Kim | B60W 30/18009 |
| 2018/0037223 A1* | 2/2018 | Goto | B60W 30/08 |
| 2020/0307579 A1* | 10/2020 | Mizoguchi | B62D 15/025 |
| 2020/0307596 A1* | 10/2020 | Yashiro | B60W 30/18163 |

FOREIGN PATENT DOCUMENTS

| | | | | |
|---|---|---|---|---|
| CN | 108622081 A | 10/2018 | | |
| WO | WO-2016159170 A1 * | 10/2016 | ............ | B60W 10/04 |

* cited by examiner

*Primary Examiner* — Peter D Nolan
*Assistant Examiner* — Demetra R Smith-Stewart
(74) *Attorney, Agent, or Firm* — Frank A. MacKenzie; Bejin Bieneman PLC (57) ABSTRACT

A current lane of vehicle operation is determined to be branched at a location into a through lane and a deceleration lane based on first sensor data indicating an increased width of the current lane exceeds a predetermined width at the location. Then the vehicle is determined to be operating in one of (a) the deceleration lane, or (b) the through lane, based on second sensor data. Then one of (a) an assist feature of the vehicle is activated to a disabled state based on determining the vehicle is in the deceleration lane, or (b) the assist feature is maintained in an enabled state based on determining the vehicle is in the through lane.

20 Claims, 6 Drawing Sheets

VEHICLE LANE-BASED CONTROL

BACKGROUND

A vehicle can be equipped with electronic and electromechanical components, e.g., computing devices, networks, sensors and controllers, etc. A vehicle computer can acquire data regarding the vehicle's environment and can operate the vehicle or at least some components thereof based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

A system includes a computer including a processor and a memory, the memory storing instructions executable by the processor to determine that a current lane of vehicle operation is branched at a location into a through lane and a deceleration lane based on first sensor data indicating an increased width of the current lane exceeding a predetermined width at the location. The instructions further include instructions to then determine the vehicle is operating in one of (a) the deceleration lane, or (b) the through lane, based on second sensor data. The instructions further include instructions to then, one of (a) activate an assist feature of the vehicle to a disabled state based on determining the vehicle is in the deceleration lane, or (b) maintain the assist feature of the vehicle in an enabled state based on determining the vehicle is in the through lane.

The instructions can further include instructions to, upon determining that the vehicle has moved from the deceleration lane to the through lane, activate the assist feature to the enabled state.

The instructions can further include instructions to identify a junction of a road and a current road of vehicle operation based on the junction being within a specified distance of the vehicle.

The instructions can further include instructions to determine that the current lane is branched into the through lane and the deceleration lane based further on identifying the junction.

A distance from the location to the junction may be less than the specified distance.

The instructions can further include instructions to, upon determining a curvature of the road, activate the assist feature to the disabled state based further on the curvature being greater than a threshold curvature.

The instructions can further include instructions to prevent activation of the assist feature to the enabled state based on the curvature of the road being greater than the threshold curvature.

The instructions can further include instructions to determine the curvature of the road based on at least one of map data and sensor data.

The instructions can further include instructions to prevent activation of the assist feature to the enabled state based on a type of the road.

The instructions can further include instructions to prevent activation of the assist feature to the enabled state based on determining the vehicle is in the deceleration lane.

The instructions can further include instructions to verify the vehicle is operating in one of the deceleration lane or the through lane based on a confidence estimate being above a threshold.

The instructions can further include instructions to determine the confidence estimate based on the second sensor data.

The instructions can further include instructions to operate the vehicle based on the assist feature when the assist feature is in the enabled state.

The instructions can further include instructions to adjust at least one of a speed of the vehicle and a distance between the vehicle and another vehicle based on the assist feature.

A method includes determining that a current lane of vehicle operation is branched at a location into a through lane and a deceleration lane based on first sensor data indicating an increased width of the current lane exceeding a predetermined width at the location. The method further includes then determining the vehicle is operating in one of (a) the deceleration lane, or (b) the through lane, based on second sensor data. The method further includes then, one of (a) activating an assist feature of the vehicle to a disabled state based on determining the vehicle is in the deceleration lane, or (b) maintaining the assist feature of the vehicle in an enabled state based on determining the vehicle is in the through lane.

The method can further include, upon determining that the vehicle has moved from the deceleration lane to the through lane, activating the assist feature to the enabled state.

The method can further include identifying a junction of a road and a current road of vehicle operation based on the junction being within a specified distance of the vehicle.

The method can further include determining that the current lane is branched into the through lane and the deceleration lane based further on identifying the junction.

The method can further include, upon determining a curvature of the road, activating the assist feature to the disabled state based further on the curvature being greater than a threshold curvature.

The method can further include preventing activation of the assist feature to the enabled state based on determining the vehicle is in the deceleration lane.

Further disclosed herein is a computing device programmed to execute any of the above method steps. Yet further disclosed herein is a computer program product, including a computer readable medium storing instructions executable by a computer processor, to execute an of the above method steps.

With reference to the various figures, a vehicle 105 operates on a road 200. The vehicle 105 includes a vehicle computer 110 that receives data from sensors 115. The computer 110 is programmed to determine that a current lane 203 of vehicle operation is branched (i.e., divides into at least two lanes 203) at a location 215. For example, the computer 110 can determine that a lane 203 is branched into a through lane 203*t* and a deceleration lane 203*d* based on first sensor 115 data indicating an increased width W of the current lane 203 exceeding a predetermined width at the location 215. The vehicle computer 110 is further programmed to then determine that the vehicle is operating in one of (a) the deceleration lane 203*d*, or (b) the through lane 203*t*, based on second sensor 115 data. The vehicle computer 110 is further programmed to then one of (a) activate an assist feature of the vehicle 105 to a disabled state based on determining the vehicle 105 is in the deceleration lane 203*d*, or (b) maintain the assist feature of the vehicle 105 in an enabled state based on determining the vehicle 105 is in the through lane 203*t*.

The vehicle 105 includes one or more assist features. An assist feature is an operation in a vehicle to actuate one or more vehicle components 125 to assist or supplement user operation of the vehicle 105. For example, the vehicle computer 110 can at least partially control the vehicle 105 based on the assist features. An example assist feature is lane-keeping, in which the computer 110 controls actuators 120 and/or components 125 to maintain the vehicle 105 in a lane 203 of a road 200. That is, the vehicle computer 110 may initiate assist features based on analyzing data from sensors 115 and or components 125, e.g., relating to vehicle 105 speed, heading(s), etc., to actuate one or more vehicle components 125, to aid the user in operating the vehicle 105 in the current lane 203. The vehicle computer 110 can initiate or suppress assist features based on identifying a current road 200 of vehicle operation. Typically, the vehicle computer 110 can identify the current road 200 of vehicle operation based on location data, e.g., GPS data, of the vehicle 105. However, due to limitations in resolution and/or inaccuracies in the GPS data, the vehicle computer 110 may be unable to determine that the vehicle 105 is moving from the current road 200 to another road. Further, when a current road 200 cannot be identified and/or is inaccurately identified, the vehicle computer 110 can initiate assist features appropriate or desirable for a road 200 incorrectly identified as the current road.

Advantageously, upon determining that the current lane 203 is branched into a through lane 203*t* and a deceleration lane 203*d*, the vehicle computer 110 can determine whether the vehicle 105 is operating in the deceleration lane 203*d* (i.e., departing the current road 200) or the through lane 203*t* (i.e., remaining on the current road 200) based on sensor 115 data. Upon determining the vehicle 105 is operating in the deceleration lane 203*d*, the vehicle computer 110 can disable one or more assist features appropriate or desirable only for the current road 200 to prevent undesired activation of disabled assist features thereby improving vehicle operation in the deceleration lane 203*d*.

Figure 1:
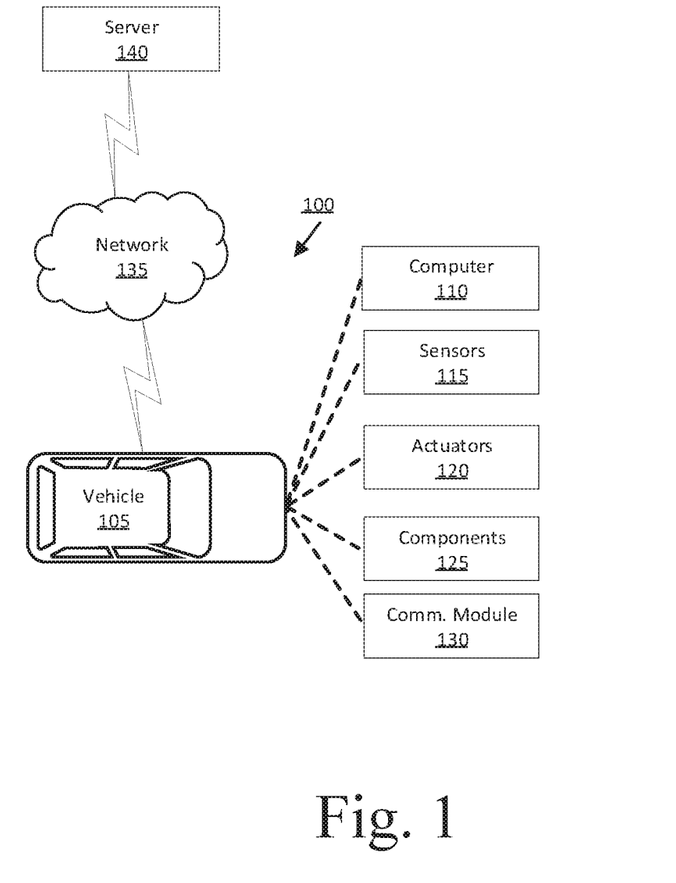
FIG. 1 is a block diagram illustrating an example vehicle control system for a vehicle.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a server 140 and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The computer 110 can further include two or more computing devices operating in concert to carry out vehicle 105 operations including as described herein. Further, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a server 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along the current road 200. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a server 140 (typically via direct radio frequency communications). The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the server 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The server 140 can be a conventional computing device, i.e., including one or more processors and one or more memories, programmed to provide operations such as disclosed herein. Further, the server 140 can be accessed via the network 135, e.g., the Internet, a cellular network, and/or or some other wide area network.

Figure 2:
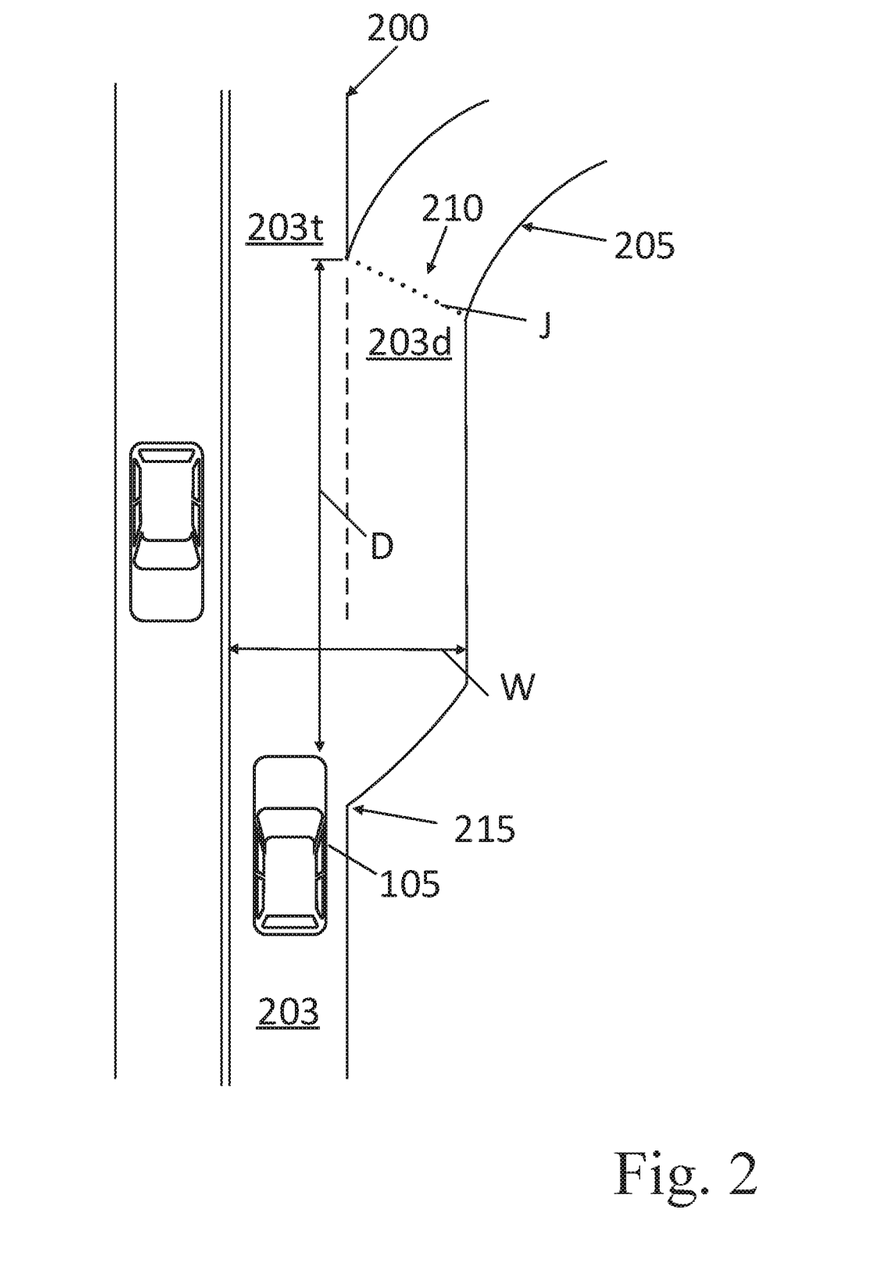
FIG. 2 is a diagram illustrating a current road of vehicle operation including a current lane branching into a through lane and a deceleration lane.

FIG. 2 is a diagram illustrating a vehicle 105 operating in an example lane 203 of an example road 200. A lane is a specified area of the road for vehicle travel. A road is an area of ground surface that includes any surface provided for land vehicle travel. A lane of a road is an area defined along a length of a road having a width W to accommodate only one vehicle, i.e., multiple vehicles can travel in a lane one in front of the other, but not abreast of, i.e., laterally adjacent, one another. The vehicle computer 110 may, for example, identify the current road 200 of vehicle operation based on data, e.g., map data, received from a remote computer, e.g., a server 140.

Upon identifying a current road 200 of vehicle operation, the vehicle computer 110 may determine one or more characteristics of the current road 200, i.e., physical quantities that describe measurements and/or limitations of the road 200. For example, road 200 characteristics can include a curvature, an inclination, a speed limit, number of lanes, etc., based on map data. The vehicle computer 110 can then determine a type of the current road 200 based on the characteristics of the current road 200. A type of road is a classification of the road that describes expected vehicle use of the road. Each type of road is further defined by a plurality of predefined characteristics. A road type can be identified by an identifier that describes the road type. Non-limiting examples of types of roads include: highways, freeways, expressways, service drives, side streets, off-ramps, on-ramps. The plurality of predefined characteristics for each type of road may be specified, e.g., by government regulations. For example, some types of roads may have a curvature above a curvature threshold (as described below) and a speed limit above a threshold speed, e.g., 50 miles per hour, and other types of roads may have a curvature below the curvature threshold a speed limit above the threshold speed.

The vehicle computer 110 may supplement or assist the user in operating the vehicle 105 in a lane 203 of a road 200 by providing one or more assist features. That is, the vehicle computer 110 may initiate one or more assist features to aid the user in operating the vehicle 105 in the current lane 203 based on sensor 115 data. Said differently, the vehicle computer 110 can actuate one or more vehicle components 125 to adjust operation of the vehicle 105 based data about the environment around the vehicle 105.

For example, the vehicle computer 110 can adjust the speed of the vehicle 105, e.g., according to on the speed of other vehicles operating in the current lane 203, based on an adaptive cruise control assist feature. As an alternative or additional example, the vehicle computer 110 can operate the vehicle 105 to maintain at least a minimum distance Dm from a vehicle in front of the vehicle 105 in the current lane 203 (see FIG. 3B). The minimum distance may be determined based on, e.g., empirical testing to determine a minimum distance in which the vehicle computer 110 can stop the vehicle 105 (e.g., based on the speed of the vehicle 105). As yet another example, the vehicle computer 110 according to a lane-keeping assist feature can adjust lateral movement of the vehicle 105 within a current lane 203. Non-limiting examples of assist features include adaptive cruise control, blind spot monitor, lane departure warning, lane keep assist, lane centering, forward collision warning, etc.

The vehicle computer 110 can selectively enable or disable one or more assist features, e.g., based on a type of current road 200 (i.e., based on a plurality of characteristics of the type of the current road 200). If the type of the current road 200 is, e.g., a service drive, an off-ramp, or a side street, then the vehicle computer 110 can deactivate, e.g., an adaptive cruise control assist feature, to a disabled state. If the type of the current road 200 is, e.g., a highway, a freeway, or an expressway, then the vehicle computer 110 can activate, e.g., the adaptive cruise control assist feature, to an enabled state.

Alternatively of additionally, the vehicle computer 110 can activate or deactivate one or more assist features based on a characteristic of the current road 200. For example, the vehicle computer 110 may activate assist feature(s) between the enabled state and the disabled state based on the curvature of the current road 200. For example, upon determining the curvature of the current road 200, the vehicle computer 110 can compare the curvature to a threshold curvature, e.g., stored in a memory. The threshold curvature is a maximum curvature of a road that a vehicle computer 110 can enable one or more assist features. The threshold curvature may be determined based on, e.g., empirical testing to determine the maximum curvature that the vehicle computer 110 can operate the vehicle 105 based on one or more assist features. If the curvature of the current road 200 is less than or equal to the curvature threshold, then the vehicle computer 110 can activate one or more assist features, e.g., adaptive cruise control, to the enabled state. If the curvature of the current road 200 is greater than the curvature threshold, then the vehicle computer 110 can activate one or more assist features, e.g., adaptive cruise control, to the disabled state.

Additionally, or alternatively, the vehicle computer 110 may enable or disable assist feature(s) based on a speed limit of a current road 200. For example, upon determining the speed limit of the current road 200, the vehicle computer 110 can compare the speed limit to the threshold speed, e.g., stored in a memory. The threshold speed is a minimum vehicle 105 speed at which a vehicle computer 110 can provide one or more assist features. The threshold speed may be determined based on, e.g., empirical testing to determine the minimum speed that the vehicle computer 110 can operate the vehicle 105 based on one or more assist features. If the speed limit of the current road 200 is less than or equal to the threshold speed, then the vehicle computer 110 can activate one or more assist features, e.g., adaptive cruise control, to the disabled state. If the speed limit of the current road 200 is greater than the threshold speed, then the vehicle computer 110 can activate one or more assist features, e.g., adaptive cruise control, to the enabled state.

The vehicle computer 110 may identify a junction 210 of a second road 205 with a first (e.g., current) road 200 based on sensor 115 data and/or data received from the server 140. As used herein, a junction 210 is defined by a line J that demarcates the second road 205 from the current road 200. That is, the vehicle 105 transitions from operating in the deceleration lane 203d to the second road 205 at the junction 210. For example, the line J may extend across the second road 205 where the second road 205 meets the deceleration lane 203d of the current road 200. In such an example, the line J is defined by a first point on one side of the second road 205 and a second point on the other side of the second road 205. Specifically, the first point is a location, e.g., specified by geo-coordinates, where the one side of the second road 205 meets the deceleration lane 203d, and the second point is a location, e.g., specified by geo-coordinates, where the other side of the second road 205 meets the deceleration lane 203d. As another example, the line J may extend across the deceleration lane 203d where the second road 205 meets the deceleration lane 203d. In such an example, the line J is defined by a first location where one side of the deceleration lane 203d meets the second road 205 and a second location where the other side of the deceleration lane 203d meets the second road 205. For example, the vehicle computer 110 may identify the junction 210 based on map data, e.g., received from the server 140. For example, the map data may specify geo-fences, i.e., boundary or containment lines specified by geo-coordinates, of the current road 200 and the second road 205. The vehicle computer 110 can determine the junction 210 based on a portion of the geo-fence for the second road 205 overlapping a portion of the geo-fence for the current road 200. As another example, the vehicle computer 110 can detect a sign, or marker, proximate to (i.e., within sensor and/or visual range) the current lane 203 via image data. The vehicle computer 110 can compare a detected sign, i.e., an image of the sign, to a plurality of images of signs, e.g., stored in a look-up table or the like, and identify the junction 210 based on the detected sign matching a stored sign identifying the junction 210.

The vehicle computer 110 may identify the junction 210 based further on the junction 210 being within a specified distance of the vehicle 105. For example, the vehicle computer 110 can determine a distance D along the current road 200 from the vehicle 105 to the junction 210 (see FIG. 2) based on a location of the vehicle 105, e.g., received from a sensor 115, a navigation system, etc., and map data. The location of the vehicle 105 may be specified in geo-coordinates on the current road 200. In such an example, the vehicle computer 110 can identify the junction 210 based on map data and can determine the vehicle 105 location based on sensor 115 data. The vehicle computer 110 can then determine the distance D along the current road from the vehicle 105 location to the junction 210 based on the map data. For example, the vehicle computer 110 can determine the distance D along the current road based on a length of the current road 200 between geo-coordinates specifying the line J that defines the junction 210 and geo-coordinates specifying the vehicle 105 location.

Additionally or alternatively, the vehicle computer 110 can determine the distance D along the current road 200 from the vehicle 105 to the line J defining the junction 210 based on image data. For example, the vehicle computer 110 can detect a sign specifying a distance from the sign to the line J in image data, e.g., according to image processing techniques, such as optical character recognition (OCR). The vehicle computer 110 can then determine a distance between the vehicle 105 and the sign based on sensor 115 data. For example, a lidar sensor 115 can emit a light beam and receive a reflected light beam reflected off an object, e.g., the sign. The vehicle computer 110 can measure a time elapsed from emitting the light beam to receiving the reflected light beam. Based on the time elapsed and the speed of light, the vehicle computer 110 can determine the distance between the vehicle 105 and the sign. The vehicle computer 110 can then determine the distance D from the vehicle 105 to the line J by summing the distance from the vehicle 105 to the sign and the distance from the sign to the line J.

The vehicle computer 110 can then compare the distance D to the specified distance. The specified distance specifies a distance from the vehicle 105 along the current road 200 within which the vehicle computer 110 can identify the junction 210. The specified distance prevents the vehicle computer 110 from incorrectly identifying a deceleration lane 203d (as discussed below) when the vehicle 105 is not within an appropriate distance of the line J. The specified distance may be determined based on, e.g., empirical testing to determine a length of a deceleration lane 203d (e.g., based on a type of the current road 200, a type of a second road 205, etc.). If the distance D is greater than the specified distance, then the vehicle computer 110 cannot identify the junction 210. That is, the vehicle computer 110 identifies each of the at least two lanes as through lanes 203t. If the distance D is less than or equal to the specified distance, then the vehicle computer can identify the junction 210. That is, the vehicle computer 110 can identify at least one deceleration lane 203d.

The vehicle computer 110 is programmed to identify a current lane 203 of vehicle operation on the current road 200. For example, when a current road 200 has more than one lane 203, map data and/or location data, e.g., GPS data, may lack resolution to identify the current lane 203 of vehicle operation. The vehicle computer 110 may, for example, identify the current lane 203 of vehicle operation based on sensor 115 data. That is, the vehicle computer 110 can be programmed to receive sensor 115 data, typically image data, from sensors 115 and to implement various image processing techniques to identify the current lane 203 of vehicle operation. For example, lanes can be indicated by markings, e.g., painted lines on the current road 200, and image recognition techniques, such as are known, can be executed by the vehicle computer 110 to identify the current lane 203 of vehicle operation. For example, the vehicle computer 110 can identify solid lane markings on opposite sides of the vehicle 105. The vehicle computer 110 can then identify the current lane 203 of vehicle operation based on a number of groups of dashed lane markings between each side of the vehicle 105 and the respective solid lane marking. A solid lane marking is a marking extending continuously, i.e., is unbroken, along a length of a road and defining at least one boundary of a lane. A group of dashed lane markings includes a plurality of markings spaced from each other along a length of a road and defining at least one boundary of a lane. Additionally, the vehicle computer 110 can determine a number of lanes on the current road 200 based on the number of groups of dashed lane markings (e.g., the number of lanes is one more than the number of groups of dashed lane markings).

The vehicle computer 110 can determine a width W of a current lane 203 based on first sensor 115 data. For example, the vehicle computer 110 identifies the current lane 203 in the image data, e.g., using various image processing techniques and/or techniques for detecting and measuring objects represented in image data. For example, the vehicle computer 110 can determine the width W of the current lane 203 based on determining lane markings of the current lane 203 from image data. For example, the vehicle computer 110 can identify a set of pixel coordinates in an image associated with a lane marking of a current lane 203 and determine a distance (in pixel coordinates) from an image sensor 115 lens to the identified lane marking pixel coordinates. The vehicle computer 110 can then determine a distance of a vehicle 105 sensor 115 lens from the lane marking of the current lane 203, e.g., by using plane projective mapping, which is a projection from one plane (e.g., defined by the image) through a point (e.g., defined by a sensor 115 lens) to another plane (e.g., defined by the current road 200). That is, the vehicle computer 110 can determine a distance from the lens to the identified coordinates (in pixel coordinates) and can further determine, from the image, an angle between a line from the sensor 115 lens to the identified lane marking and an axis extending from the lens parallel to a longitudinal axis of the vehicle 105. Then, using trigonometric functions, the vehicle computer 110 can determine a length of a line drawn perpendicularly to the vehicle 105 longitudinal axis from the sensor 115 lens to a point on the lane marking of the current lane 203. By repeating this process for a lane marking of the current lane 203 on the other side of the vehicle 105, and summing the lengths of two lines perpendicular to the vehicle 105 longitudinal axis and drawn from the sensor 115 lens to the respective lane marking, the width W of the lane may be determined. Further, the vehicle computer 110 can determine a lateral position of the vehicle 105 in the current lane 203 based on the length of at least one line perpendicular to the vehicle 105 longitudinal axis and drawn from the sensor 115 lens to the respective lane marking.

Additionally or alternatively, the vehicle computer 110 can determine a width of the current road 200 based on the first sensor 115 data. For example, the vehicle computer 110 can determine the width of the current road 200 based on determining edges, e.g., solid lane markings, of the current road 200 based on image data. The vehicle computer 110 can then determine the width of the current road 200 based on the process described above.

The vehicle computer 110 can determine the width W of the current lane 203 and/or current road 200 substantially continuously or periodically. For example, the vehicle computer 110 can receive and analyze the first sensor 115 data substantially continuously while operating the vehicle 105 in the current lane 203. As another example, the vehicle computer 110 can receive and analyze the first sensor 115 data based on identifying the junction 210, i.e., determining the line J is within the specified distance of the vehicle 105.

The vehicle computer 110 can determine that the current lane 203 is branched based on the width W of the current lane 203. For example, the vehicle computer 110 can compare the width W of the current lane 203 to a predetermined width. The predetermined width is a width specified for a roadway lane, e.g., determined according to a width for a vehicle in a single line, i.e., one behind the other, in a direction of travel. For example, the predetermined width may be a standard width, e.g., specified by government regulations. If the width W of the current lane 203 does not exceed, i.e., is less than or equal to, the predetermined width, then the vehicle computer 110 determines that the current lane 203 is not branched. If the width W of the current lane 203 exceeds, i.e., is greater than, the predetermined width, the vehicle computer 110 determines that the current lane 203 is branched into at least two lanes.

Additionally, or alternatively, the vehicle computer 110 can determine that the current lane 203 is branched into at least two lanes based on image data. For example, the vehicle computer 110 can detect lane markings of the current lane 203 in the image data, as described above. That is, the vehicle computer 110 can detect a closest lane marking to each side of the vehicle 105 in the image data. The vehicle computer 110 can, e.g., using image processing techniques, determine that respective lane markings of the current lane 203 are diverging, i.e., the width W is increasing. For example, the vehicle computer 110 can determine the width W (e.g., a first width) of the current lane 203 (as described above) and store the width W in a memory. The vehicle computer 110 can then determine another width W (e.g., a second width) of the current lane 203, e.g., upon identifying a junction 210. The vehicle computer 110 can then compare the first width of the current lane 203 to the second width of the current lane 203. If the second width of the current lane 203 is greater than the first width of the current lane 203, the vehicle computer 110 can determine that the respective lane markings are diverging and that the current lane 203 has branched.

Additionally or alternatively, the vehicle computer 110 can determine that a current lane 203, or any other lane of a current road 200, is branched based on the width of the current road 200. For example, the vehicle computer 110 can compare the width of the current road 200 to a predetermined threshold. The predetermined threshold is a minimum width based on the number of lanes. That is, the predetermined threshold is a product of the predetermined width of the lane and the number of lanes. If the width of the current road 200 exceeds the predetermined threshold, then the vehicle computer 110 can determine that at least one lane is branched. In such an example, the vehicle computer 110 can then identify the lane that branched based on image data, e.g., detecting which lane markings diverged (as described above). If the width of the current road 200 does not exceed the predetermined threshold, then the vehicle computer 110 can determine that no lanes are branched.

The vehicle computer 110 can then identify the at least two lanes based on identifying the junction 210. For example, upon identifying the junction 210, i.e., that the line J is within the specified distance from the vehicle 105, the vehicle computer 110 can identify one lane as a through lane 203t and at least one other lane as a deceleration lane 203d. A through lane 203t continues along the current road 200 across the line J. A deceleration lane 203d terminates on the current road 200 at the line J. In other words, the deceleration lane 203d extends along the current road 200 to the second road 205. As another example, upon determining that the junction 210 is beyond the specified distance from the vehicle 105, the vehicle computer 110 may identify each of the at least two lanes as a through lane 203t.

Additionally or alternatively, the vehicle computer 110 can identify the at least two lanes based on the location 215 at which the current lane 203 branches. The vehicle computer 110 can identify the location 215 at which the current lane 203 branches based on the first sensor 115 data. For example, the vehicle computer 110 can receive a location of the vehicle 105, e.g., from a sensor 115, a navigation system, etc. Upon determining the current lane 203 is branched, the vehicle computer 110 can then determine the location 215 at which the current lane 203 branched, e.g. specified by geo-coordinates on the current road 200, is the same location as the vehicle 105. The vehicle computer 110 can then determine a distance, e.g., along the current road 200, from the location 215 to the line J defining the junction 210 based on map data. For example, the vehicle computer 110 can determine the distance based on a length of the current road 200 between the geo-coordinates of the location 215 and the geo-coordinates of the line J. The vehicle computer 110 can then compare the distance to the specified distance. If the distance from the location 215 to the line J is less than or equal to the specified distance, then the vehicle computer 110 can identify one lane as the through lane 203t and the other lane(s) as the deceleration lane(s) 203d. If the distance from the location 215 to the line J is greater than the specified distance, then the vehicle computer 110 can identify the at least two lanes 203 as through lanes 203t.

The current lane 203 may branch into one through lane 203t and one or more deceleration lanes 203d, e.g., when the location 215 is within the specified distance of the line J. The vehicle computer 110 can determine a number of deceleration lanes 203d based on the first sensor 115 data. For example, upon determining that the current lane 203 is branched, the vehicle computer 110 can identify a number of groups of dashed lane markings in image data, as described above. The vehicle computer 110 can then determine a difference in the number of groups of dashed lane markings prior to the location 215 that the current lane 203 branched and the number of groups of dashed lane markings after the location 215. The number of deceleration lanes 203d is the same as the difference in the number of groups of dashed lane markings. As another example, the vehicle computer 110 can determine a number of deceleration lanes 203d based on the width of the current road 200. For example, the vehicle computer 110 can determine the width of the current road 200 (as described above) after the location 215 and determine a difference between the width of the current road 200 after the location 215 to the width of the current road 200 prior to the location 215. The vehicle computer 110 can then determine the number of deceleration lanes 203d based on a ratio of the difference in the width of the current road 200 to the predetermined width.

The vehicle computer 110 can determine which side of the current road 200 the deceleration lane 203d is located on based on the first sensor 115 data. For example, the vehicle computer 110 can determine which side of the current road 200 the deceleration lane 203d is located on based on map data. For example, the vehicle computer 110 can determine the deceleration lane 203d is on a same side of the current road 200 as the second road 205 that meets the current road 200 at the junction 210. Additionally, or alternatively, the vehicle computer 110 can identify the lane markings of the current lane 203 based on image data and can then determine the lane markings are diverging, as described above. The vehicle computer 110 can then determine on which side of the current road 200 the deceleration lane 203d is located based on a lateral distance, i.e., the length of a line drawn from the longitudinal axis of the vehicle 105 to the respective lane marking (as described above), between the vehicle 105 and the respective lane marking increasing after the location 215. Upon identifying the side of the current road 200 on which the deceleration lane 203d is located, the vehicle computer 110 can identify the side with the deceleration lane 203d as a first side and the side without the deceleration lane 203d as a second side.

Upon determining that the current lane 203 is branched, the vehicle computer 110 can determine an updated lane of vehicle operation. For example, the user may operate, i.e., steer, the vehicle 105 into one of the through lane 203t or the deceleration lane 203d after the location 215. For example, the vehicle computer 110 can determine whether the vehicle 105 is operating in the through lane 203t or the deceleration lane 203d based on second sensor 115 data. That is, the vehicle computer 110 can be programmed to receive sensor 115 data, e.g., image data, from sensors 115 and to implement various image processing techniques to identify the updated lane of vehicle operation. For example, the vehicle computer 110 can identify the lane markings in image data, as discussed above. The vehicle computer 110 receives the second sensor 115 data after determining that the current lane 203 is branched.

Figure 3A:
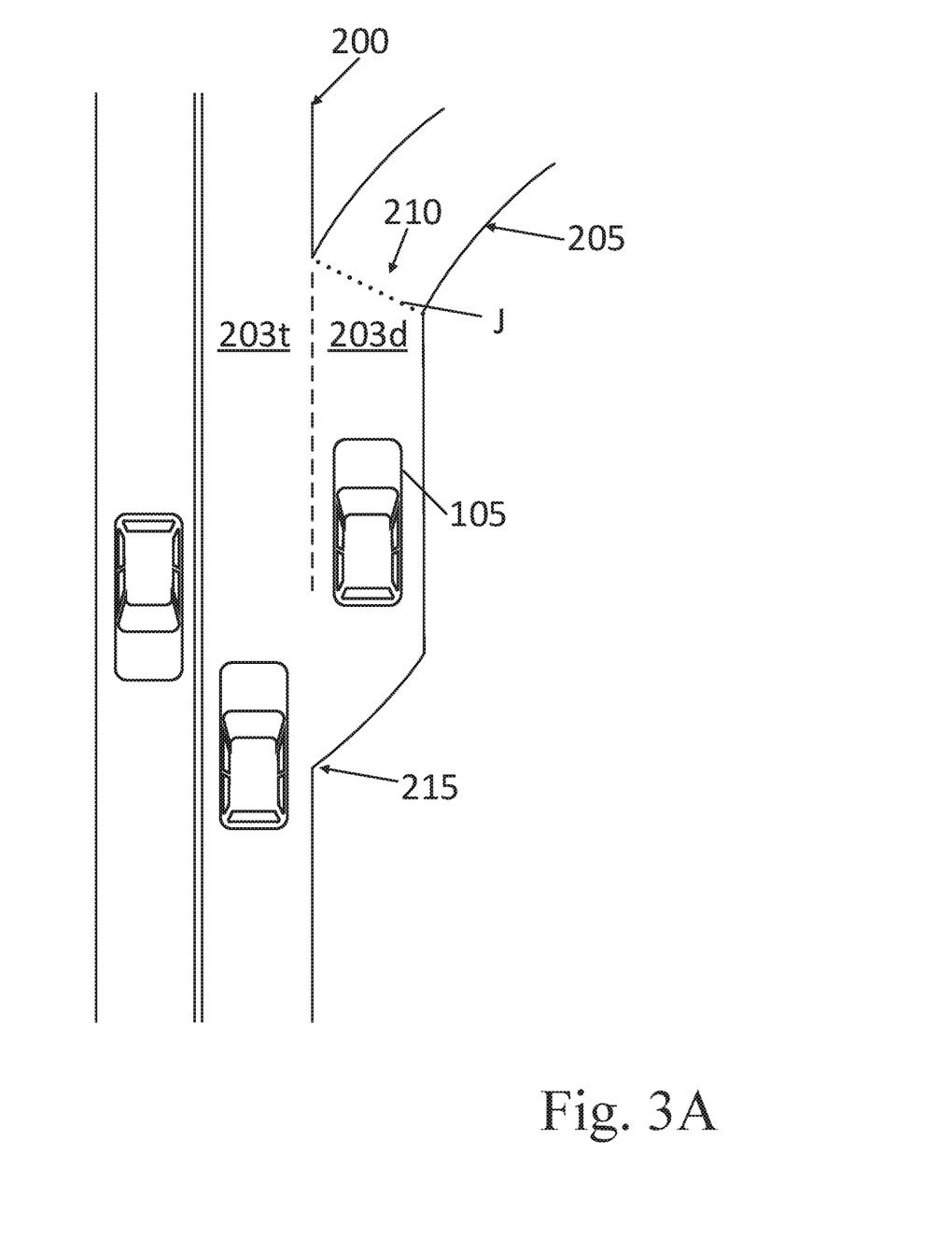
FIGS. 3A-3B are diagrams of example lanes of vehicle operation after the current lane branches.
Figure 3B:
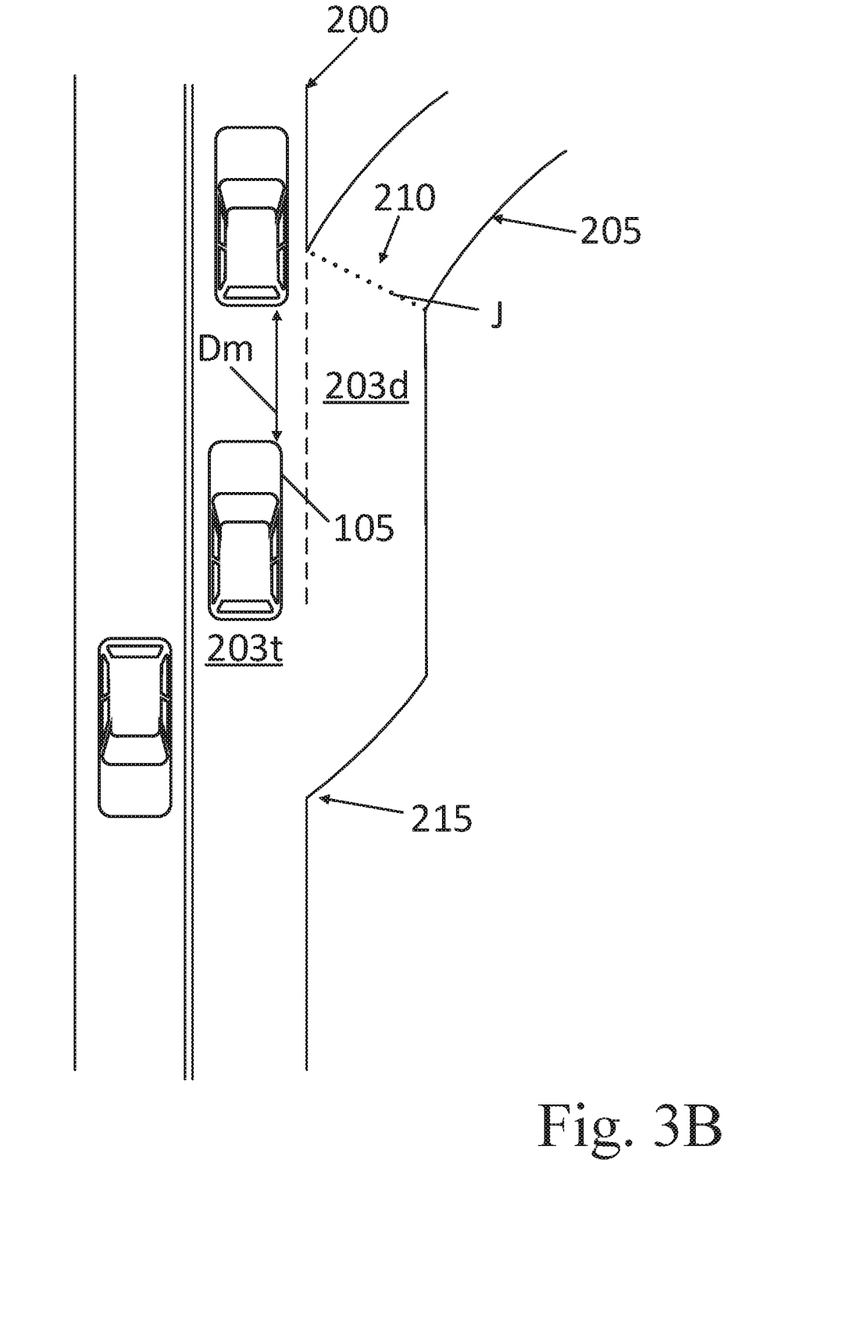
Figure 3C:
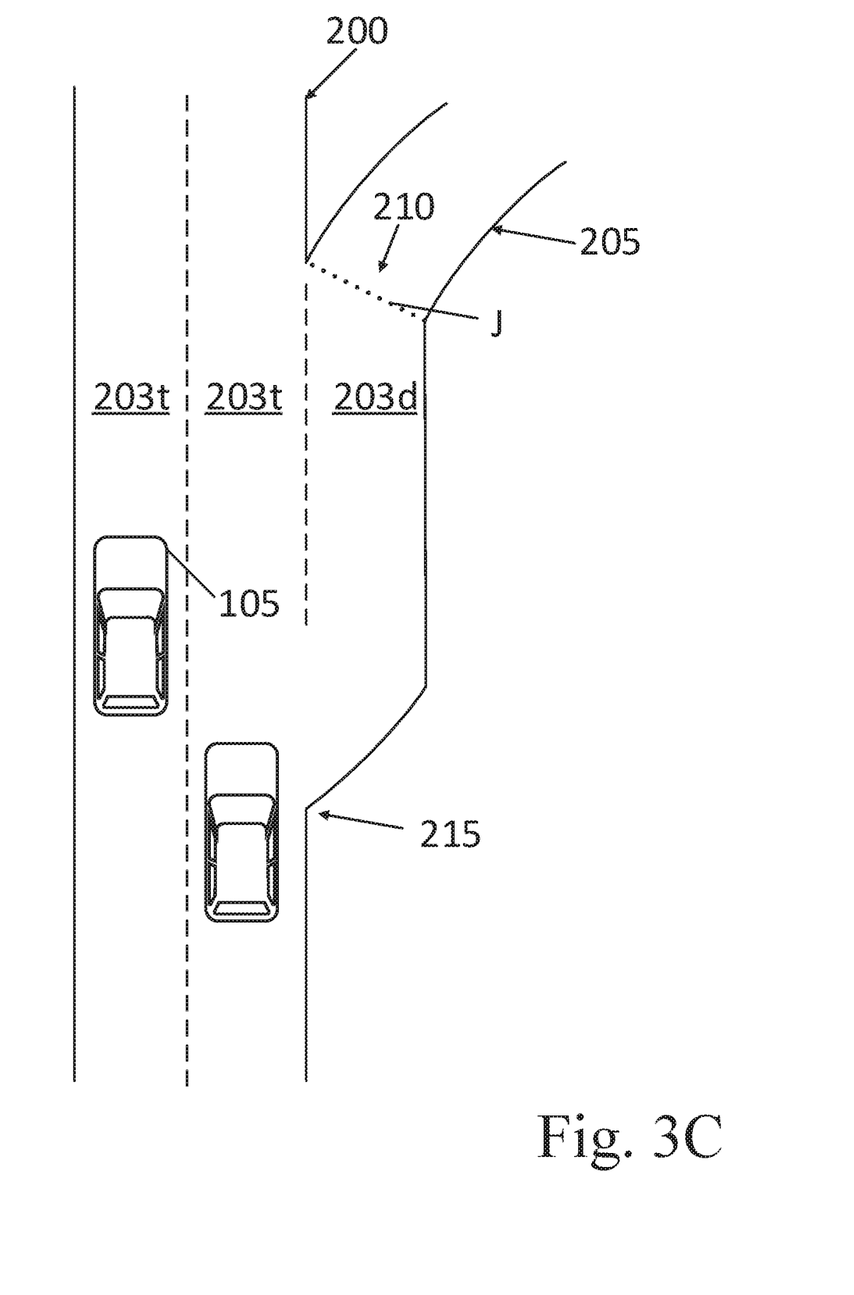
FIG. 3C is a diagram illustrating a current road of vehicle operation including a plurality of through lanes and the deceleration lane.

The vehicle computer 110 can then determine whether the vehicle 105 is operating in the deceleration lane 203d or the through lane 203t based on the lane markings. For example, upon determining that the current lane 203 is branched, the vehicle computer 110 can identify an updated lane marking that partially defines the deceleration lane 203d. An updated lane marking is a lane marking that is present after the location 215 and was not present prior to the location 215. For example, the updated lane marking may be a group of dashed lane markings between the through lane 203t and the deceleration lane 203, as shown in FIGS. 2-3C. The vehicle computer 110 can then determine whether the vehicle 105 is in the deceleration lane 203d or the through lane 203t based on the position of the updated lane marking relative to the vehicle 105. If the updated lane marking is between the vehicle 105 and the first side of the current road 200, then the vehicle computer 110 can determine that the vehicle 105 is in the through lane 203t. If the updated lane marking is between the vehicle 105 and the second side of the current road 200, then the vehicle computer 110 can determine that the vehicle 105 is in the deceleration lane 203d.

Additionally, or alternatively, the vehicle computer 110 can determine an updated lane of vehicle operation based on a number of lanes between the vehicle 105 and each side of the current road 200. For example, the current road 200 may include solid lane markings on each side of the current road 200, as set forth above. The vehicle computer 110 can then determine the number of lanes between the vehicle 105 and each respective side, i.e., solid lane markings, based on the second sensor 115 data. For example, the vehicle computer 110 can identify the number of groups of dashed lane markings, e.g., by using image processing techniques, between each side of the vehicle 105 and the respective side of the current road 200 in image data. The vehicle computer 110 can determine the updated lane of vehicle operation based on comparing the number of lanes on each side of the vehicle 105 before the location 215 to the number of lanes on each side of the vehicle 105 after the location 215. If the number of lanes between the vehicle 105 and the first side of the current road 200 has increased, then the vehicle computer 110 can determine that the vehicle 105 is in the through lane 203t. If the number of lanes between the vehicle 105 and the second side of the current road 200 has increased, then the vehicle computer 110 can determine that the vehicle 105 is in the deceleration lane 203d.

Additionally, or alternatively, the vehicle computer 110 can determine an updated lane of vehicle operation based on other vehicles operating on the current road 200 in a same direction of travel as the vehicle 105. For example, the vehicle computer 110 can identify other vehicles operating on the current road 200 based on the second sensor 115 data. That is, the vehicle computer 110 can be programmed to receive sensor 115 data, e.g., image data, from sensors 115 and to implement image processing techniques to identify other vehicles operating on the current road 200 in the same direction of travel as the vehicle 105. The vehicle computer 110 can determine that the vehicle 105 is in the deceleration lane 203d based on the number of vehicles traveling abreast, i.e., laterally adjacent, to the vehicle 105 in the same direction of travel. If the number of vehicles traveling in the same direction of travel as the vehicle 105 between the vehicle 105 and the first side of the current road 200 is less than the number of deceleration lanes 203d, then the vehicle computer 110 can determine that the vehicle 105 is operating in the deceleration lane 203d. If the number of vehicles traveling in the same direction of travel as the vehicle 105 between the vehicle 105 and the first side of the current road 200 is equal to the number of deceleration lanes 203d, then the vehicle computer 110 can determine that the vehicle 105 is in the through lane 203t.

Additionally, or alternatively, upon determining that the vehicle 105 is operating in one of the through lane 203t or the deceleration lane 203d, the vehicle computer 110 can determine that the vehicle 105 is operating in an outer-most lane 203 of the current road 200. An outer-most lane 203 is a lane including a solid lane marking defining at least one side of the lane. One deceleration lane 203 is an outer-most lane 203. For example, when the current lane 203 branches into one through lane 203t and one deceleration lane 203d, the deceleration lane 203d is an outer-most lane 203. As another example, when the current lane 203 branches into one through lane 203t and a plurality of deceleration lanes 203d, the deceleration lane 203d further from the through lane 203t is an outer-most lane 203. Additionally, the through lane 203 may be an outer-most lane 203. For example, when the current road 200 includes one lane 203 prior to the location 215, then the through lane 203t and a deceleration lane 203d are both outer-most lanes 203. That is, the through lane 203t is the outer-most lane 203 on one side of the current road 200, and the deceleration lane 203d is the outer-most lane 203 on the other side of the current road 200. Alternatively, when the current road 200 includes a plurality of lanes 203 prior to the location 215, the through lane 203t is not an outer-most lane 203.

The vehicle computer 110 can output a confidence estimate that the vehicle 105 is in the outer-most lane 203. The vehicle computer 110 can determine the confidence estimate based on the second sensor 115 data. For example, the vehicle computer 110 can determine the confidence estimate based on objects and/or markings detected in the image data, e.g., by using image processing techniques. The vehicle computer 110 can output one confidence estimate for each side of the current road 200.

A confidence estimate, as used herein, is a numerical value that represents a likelihood that the vehicle 105 is in the outer-most lane 203. For example, in one implementation, the confidence estimate can be an integer on a scale from 0 to 3, inclusive. In this example, a confidence estimate of 3 represents high confidence that the vehicle 105 is in the outer-most lane 203 and a confidence estimate of 0 represents low confidence that the vehicle 105 is in the outer-most lane 203. In this example, the vehicle computer 110 can determine the confidence estimate according to a set of rules or criteria such as set forth in Table 1.

TABLE 1

Confidence Estimate Criteria

| | |
|---|---|
| 0 | Detecting another lane for travel in a same direction as the vehicle 105 between the vehicle 105 and the respective side of the current road 200 in image data. |
| 1 | For a specified duration of time, detecting another vehicle traveling in a same direction as the vehicle 105 between the vehicle 105 and the respective side of the current road 200 in image data. |
| 2 | For the specified duration of time, not detecting a solid lane marking defining the updated lane of vehicle operation between the vehicle 105 and the respective side of the current road 200 and not detecting another vehicle travelling in a same direction as the vehicle 105 between the vehicle 105 and the respective side of the current road 200 in image data. |
| 3 | For the specified duration of time, detecting a solid lane marking defining the updated lane of vehicle operation between the vehicle 105 and the respective side of the current road 200 in image data. |

That is, the vehicle computer 110 can determine the confidence estimate based on sensor 115 data. Specifically, in the above example the vehicle computer 1110 can determine the confidence estimate based on detecting at least one of a type of lane marking defining the updated lane of vehicle operation and a presence or absence of another vehicle travelling abreast of the vehicle 105 in the same direction remains unchanged for the specified duration of time, as shown in Table 1. The specified duration of time may be determined based on, e.g., empirical testing to determine an amount of time for obtaining enough sensor 115 data to identify objects and/or markings in the environment around a vehicle.

The vehicle computer 110 can verify that the vehicle 105 is in one of the through lane 203t or the deceleration lane 203d based on the confidence estimate. For example, the vehicle computer 110 can compare the confidence estimate for each side of the current road 200 to a threshold, e.g., 2. For example, the vehicle computer 110 can verify that the vehicle 105 is in the through lane 203t based on, e.g., the confidence estimate for the second side of the current road 200 being equal to or greater than the threshold. As another example, the vehicle computer 110 can verify that the vehicle 105 is in the deceleration lane 203d based on, e.g., the confidence estimate for the first side of the current road 200 being equal to or greater than the threshold. The threshold may be specified by a vehicle and/or component manufacturer.

The vehicle computer 110 is programmed to selectively activate one or more assist features to an enabled state or a disabled state based on the updated lane of vehicle operation. Upon determining that the vehicle 105 is operating in the deceleration lane 203d (see FIG. 3A), the vehicle computer 110 activates one or more assist features to the disabled state. For example, the vehicle computer 110 disables the assist feature(s) that are inappropriate or undesirable for the second road 205. That is, the vehicle computer 110 does not operate the vehicle 105 in the deceleration lane 203d based on the disabled assist feature(s). The assist feature(s) to be disabled may be specified by a vehicle and/or component manufacturer and stored in the memory of the vehicle computer 110, e.g., in a look-up table or the like.

Additionally, or alternatively, the vehicle computer 110 may activate the assist feature(s) to the disabled state based on one or more characteristics of the second road 205. For example, upon identifying the junction 210 of the second road 205 and the current road 200, the vehicle computer 110 may determine one or more characteristics of the second road 205, e.g., a curvature, a speed limit, etc., and/or a type of the second road 205 based on data, e.g., map data.

As one example, the vehicle computer 110 may activate one or more assist features to the disabled state based on one characteristic of the second road 205. For example, the vehicle computer 110 may activate the assist feature(s) to the disabled state based on the curvature of the second road 205 being greater than the threshold curvature. As another example, the vehicle computer 110 may activate the assist feature(s) to the disabled state based on the type of the second road 205. Alternatively, the vehicle computer 110 may activate one or more assist features to the disabled state based on a type of the second road 205, i.e., a plurality of characteristics. For example, upon determining that the type of the second road 205, the vehicle computer 110 may activate the assist feature(s) to the disabled state based on a list of one or more inappropriate assist features corresponding to the type of second road 205 stored in the memory of the vehicle computer 110, e.g., in a look-up table or the like.

Additionally, the vehicle computer 110 may be programmed to prevent activation of the assist feature(s) from the disabled state to the enabled state when the vehicle 105 is in the deceleration lane 203d. That is, the vehicle computer 110 may prevent a user from providing a user input, e.g., to a human-machine interface (HMI), selecting to enable one or more assist feature(s) while the vehicle 105 is operating in the deceleration lane 203d. Additionally, or alternatively, the vehicle computer 110 can prevent activation of the assist feature(s), e.g., via a user input, based on one or more characteristics of the second road 205.

Prior to activating the assist feature(s) to the disabled state, the vehicle computer 110 can output a message, e.g., a text message via a display, an audio message via speakers, etc., alerting the user that one or more assist features will be disabled. That is, the message can identify the one or more assist features that will be activated to the disabled state. The vehicle computer 110 provides the output message to allow the user time to establish control of the vehicle 105 prior to assist feature(s) being disabled. The message may be output a predetermine time before the assist feature(s) are disabled. The predetermined time may be determined based on, e.g., empirical testing to determine an amount of time users require to establish control of a vehicle 105 being operated based on assist features.

Upon determining that the vehicle 105 is in the through lane 203t (see FIGS. 3B and 3C), the vehicle computer 110 maintains the assist feature(s) in the enabled state. That is, the vehicle computer 110 operates the vehicle 105 on the current road 200 based on the appropriate or desirable assist feature(s) for the current road 200. In situations where the current road 200 has more than one through lane 203t (see FIG. 3C) the vehicle computer 110 can determine that the vehicle 105 is in any one of the through lanes Lt in a similar manner as discussed above. In these circumstances, the vehicle computer 110 is programmed to maintain the assist feature(s) in the enabled state upon determining the vehicle 105 is operating in any one of the through lanes Lt of the current road 200.

Additionally, the vehicle computer 110 may be programmed to activate the assist feature(s) from the disabled state to the enabled state based on the vehicle 105 moving from the deceleration lane 203d into the through lane 203t. That is, upon detecting that the vehicle 105 has moved out of the deceleration lane 203d, the vehicle computer 110 can activate the disabled assist feature(s) to the enabled state. In other words, the vehicle computer 110 can operate the vehicle 105 based on the assist feature(s), i.e., to initiate one or more assist features to supplement or assists the user operation of the vehicle 105 in the through lane 203t. The vehicle computer 110 can determine that the vehicle 105 has moved from the deceleration lane 203d to the through lane 203t based on identifying the updated lane of vehicle operation, e.g., using image processing techniques, as discussed above.

Figure 4:
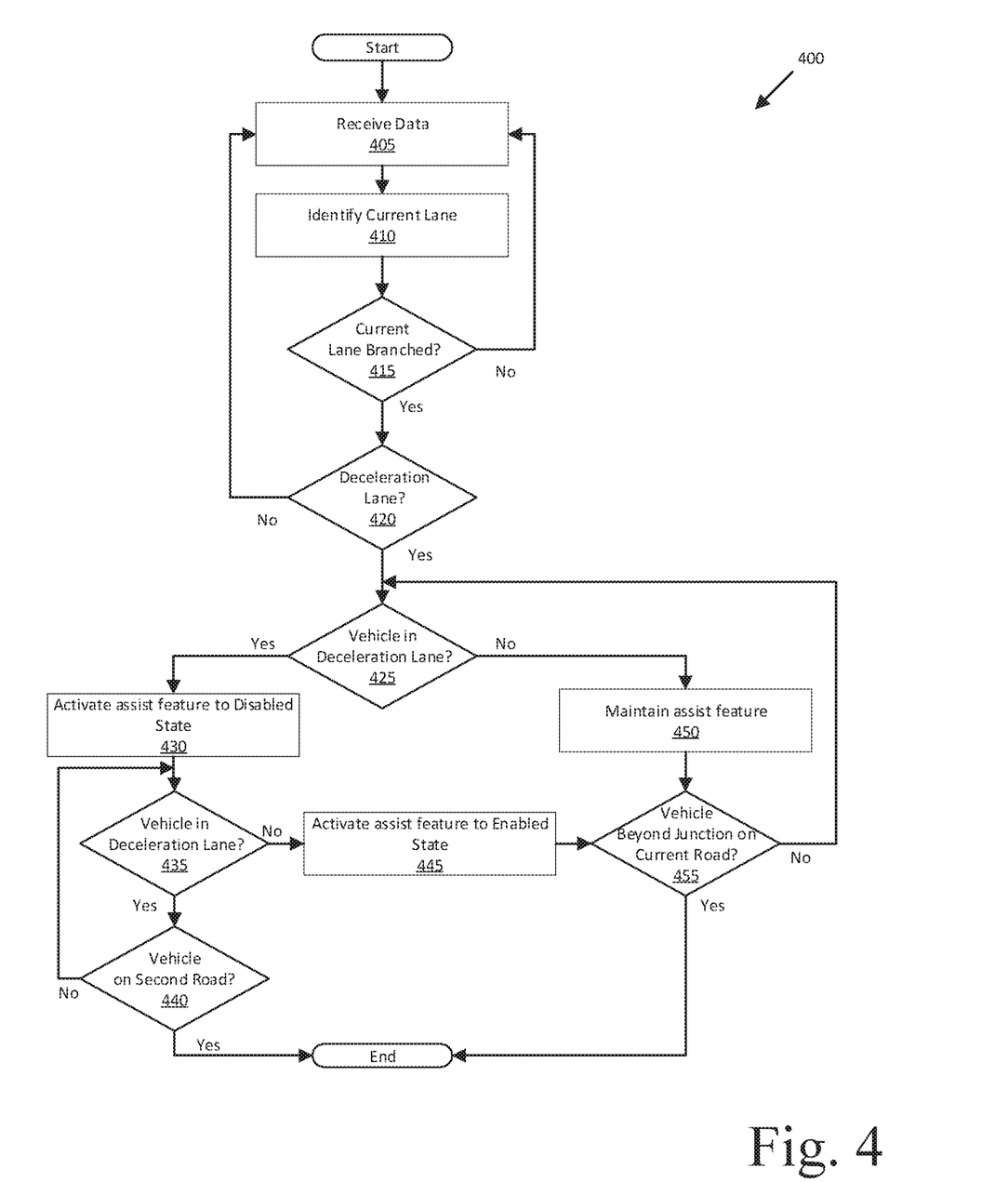
FIG. 4 is a flowchart of an example process for operating the vehicle.

FIG. 4 is a diagram of an example process 400 for operating a vehicle 105. The process 400 begins in a block 405. The process 400 can be carried out by a vehicle computer 110 executing program instructions stored in a memory thereof.

In the block 405, a vehicle computer 110 receives data from one or more sensors 115 and/or from a remote server computer 140. For example, the vehicle computer 110 can receive location data of the vehicle 105, e.g., from a sensor 115, a navigation system, etc. Additionally, the vehicle computer 110 can receive map data, e.g., from a server 140 via the network 135, including a GPS-based geo-fence specifying a perimeter of one or more roads. Additionally, or alternatively, the vehicle computer 110 can receive image data from one or more sensors 115, e.g., via the vehicle network. The image data may include the environment around the vehicle, e.g., signs, markers, other vehicles, etc. The process 400 continues in a block 410.

In the block 410, the vehicle computer 110 identifies a current lane 203 of vehicle operation. As discussed above, the vehicle computer 110 can identify a current road 200 of vehicle operation based on the location of the vehicle 105 being within a geo-fence of the current road 200. Upon identifying the current road 200, the vehicle computer 110 may, for example, identify the current lane 203 of vehicle operation based on sensor 115 data. That is, the vehicle computer 110 can be programmed to receive sensor 115 data, typically image data, from sensors 115 and to implement various image processing techniques to identify the current lane 203 of vehicle operation, as discussed above. For example, the vehicle computer 110 can identify the current lane 203 of vehicle operation based on determining lane markings on the current road 200, as discussed above. The process 400 continues in a block 415.

In the block 415, the vehicle computer 110 determines whether the current lane 203 has branched at a location 215 based on first sensor 115 data. For example, the vehicle computer 110 can determine a width W of the current lane 203 based on determining lane markings of the current lane 203 from image data, as discussed above. The vehicle computer 110 can then compare the width W of the current lane 203 to a predetermined width (as described above). If the width W of the current lane 203 does not exceed the predetermined width, then the vehicle computer 110 determines that the current lane 203 is not branched. If the width W of the current lane 203 exceeds the predetermined width, the vehicle computer 110 determines that the current lane 203 is branched into at least two lanes. Additionally, the vehicle computer 110 can identify the location 215 at which the current lane 203 branches based on a location of the vehicle 105 when the vehicle computer 110 determines the current lane 203 has branched, as discussed above.

Additionally or alternatively, the vehicle computer 110 can determine that the current lane 203 has branched based on detecting diverging lane markers. For example, the vehicle computer 110 can, e.g., using image processing techniques, determine that respective lane markings of the current lane 203 are diverging, i.e., the width W is increasing, as described above. The vehicle computer 110 can determine that the respective lane markings are diverging and that the current lane 203 has branched based on determining the width W of the current lane 203 is increasing, as discussed above.

Additionally or alternatively, the vehicle computer 110 can determine that a lane 203 has branched based on a width of the current road 200. For example, the vehicle computer 110 can determine the width of the current road 200 based on image data, as discussed above. The vehicle computer 110 can then compare the width of the current road 200 to a predetermined threshold (as discussed above). The vehicle computer 110 can determine at least one lane 203 has branched based on determining the width of the current road 200 exceeds the predetermined threshold, as discussed above.

If the vehicle computer 110 determines that the current lane 203 has branched into at least two lanes, then the process 400 continues in a block 420. Otherwise, the process 400 returns to the block 405.

In the block 420, the vehicle computer 110 determines whether the current lane 203 has branched into at least one deceleration lane 203d. For example, the vehicle computer 110 can identify at least one deceleration lane 203d based on identifying a line J defining a junction 210 within a specified distance of the vehicle 105. For example, the vehicle computer 110 can identify the junction 210 based on map data and/or image data, as discussed above. The vehicle computer 110 can then determine a distance D along the current road 200 from the vehicle 105 to the line J based on a location of the vehicle 105 and map data and/or sensor 115 data, as described above. The vehicle computer 110 can then compare the distance D to the specified distance (as described above). If the distance D is greater than the specified distance, then the vehicle computer 110 identifies each of the at least two lanes as through lanes 203t. If the distance D is less than or equal to the specified distance, then the vehicle computer identifies one lane as the through lane 203t and the other lane(s) as the deceleration lane(s) 203d.

Additionally or alternatively, the vehicle computer 110 can identify at least one deceleration lane 203d based on the location 215 at which the current lane 203 branches. Upon determining the location 215 at which the current lane 203 branches (as discussed above), the vehicle computer 110 can then determine a distance, e.g., along the current road 200, from the location 215 to the line J defining the junction 210 based on map data, as described above. The vehicle computer 110 can then compare the distance to the specified distance. If the distance from the location 215 to the line J is less than or equal to the specified distance, then the vehicle computer 110 can identify one lane as the through lane 203t and the other lane(s) as the deceleration lane(s) 203d. If the distance from the location 215 to the line J is greater than the specified distance, then the vehicle computer 110 can identify the at least two lanes 203 as through lanes 203t.

Additionally, upon identifying at least one deceleration lane 203d, the vehicle computer 110 can determine on which side of the current road 200 the at least one deceleration lane 203d is located based on the first sensor 115 data. For example, the vehicle computer 110 can determine on which side of the current road 200 the deceleration lane 203d is located based on map data and/or image data, as discuss above. Upon identifying the side of the current road 200 on which the deceleration lane 203d is located, the vehicle computer 110 can identify the side with the deceleration lane 203d as a first side and the side without the deceleration lane 203d as a second side.

If the vehicle computer 110 identifies at least one deceleration lane 203d, then the process 400 continues in a block 425. Otherwise, the process 400 returns to the block 405.

In the block 425, the vehicle computer 110 determines whether the vehicle 105 is in the deceleration lane 203d based on second sensor 115 data. For example, upon determining that the current lane 203 is branched, the vehicle computer 110 can identify an updated lane marking that partially defines the deceleration lane 203d in image data, as discussed above. The vehicle computer 110 can then determine whether the vehicle 105 is in the deceleration lane 203d or the through lane 203t based on the position of the updated lane marking relative to the vehicle 105, as discussed above.

Additionally or alternatively, the vehicle computer 110 can determine an updated lane of vehicle operation based on a number of lanes between the vehicle 105 and each side of the current road 200, as discussed above. For example, the vehicle computer 110 can identify a number of lanes on each side of the vehicle 105 in image data, as discussed above. The vehicle computer 110 can determine the updated lane of vehicle operation based on comparing the number of lanes on each side of the vehicle 105 before the location 215 to the number of lanes on each side of the vehicle 105 after the location 215, as discussed above.

Additionally, or alternatively, the vehicle computer 110 can determine an updated lane of vehicle operation based on other vehicles operating on the current road 200 in a same direction of travel as the vehicle 105, as discussed above. For example, the vehicle computer 110 can determine that the vehicle 105 is in the deceleration lane 203d based on the number of vehicles traveling abreast, i.e., laterally adjacent, to each side of the vehicle 105 in the same direction of travel as the vehicle 105, as discussed above.

Additionally, or alternatively, the vehicle computer 110 can determine that the vehicle 105 is operating in an outer-most lane 203 of the current road 200, as discussed above. In these circumstances, the vehicle computer 110 can verify that the vehicle 105 is in one of the through lane 203t or the deceleration lane 203d based on a confidence estimate. The vehicle computer 110 can output the confidence estimate based on the second sensor 115 data, as described above. For example, the vehicle computer 110 can verify the lane 203 of vehicle operation based on comparing the confidence estimate for each side of the current road 200 to a threshold, as discussed above.

If the vehicle computer 110 determines that the vehicle 105 is operating in the deceleration lane 203d, then the process 400 continues in a block 430. Otherwise, the process 400 continues in a block 455.

In the block 430, the vehicle computer 110 deactivates one or more assist features from an enabled state to a disabled state. For example, the vehicle computer 110 deactivates the assist feature(s) that are inappropriate or undesirable for the second road 205. That is, the vehicle computer 110 then cannot operate the vehicle 105 in the deceleration lane 203d based on the disabled assist feature(s). The assist feature(s) to be deactivated may be specified by a vehicle and/or component manufacturer and stored in the memory of the vehicle computer 110, e.g., in a look-up table or the like. Additionally, or alternatively, the vehicle computer 110 may activate the assist feature(s) to the disabled state based on one or more characteristics of the second road 205, as discussed above.

Additionally, the vehicle computer 110 may be programmed to prevent activation of the assist feature(s) from the disabled state to the enabled state when the vehicle 105 is in the deceleration lane 203d, as discussed above. Additionally, or alternatively, the vehicle computer 110 can prevent activation of the assist feature(s), e.g., via a user input, based on one or more characteristics of the second road 205, as discussed above.

Prior to activating the assist feature(s) to the disabled state, the vehicle computer 110 can output a message alerting the user that one or more assist features will be disabled. That is, the message can identify the one or more assist features that will be activated to the disabled state. The message may be output a predetermined time before the assist feature(s) are disabled, as discussed above. The process 400 continues in a block 435.

In the block 435, the vehicle computer 110 determines whether the vehicle 105 is operating in the deceleration lane 203d. For example, a user may maintain the vehicle 105 in the deceleration lane 203d, or may steer the vehicle 105 into a through lane 203t. The vehicle computer 110 can determine the lane of vehicle operation is the deceleration lane 203d based on second sensor 115 data using similar techniques that are discussed above in the block 425. If the vehicle computer 110 determines that the vehicle 105 is operating in the deceleration lane 203d, then the process 400 continues in a block 440. Otherwise, the process continues in a block 445.

In the block 440, the vehicle computer 110 determines whether the vehicle 105 is on the second road 205. For example, the vehicle computer 110 can determine the vehicle 105 is on the second road 205 based on the location of the vehicle 105 being within a geo-fence of the second road 205, as discussed above. As another example, the vehicle computer 110 can determine that the vehicle 105 is on the second road 205 based on the location of the vehicle 105 not being within the geo-fence of the current road 200. As another example, the vehicle computer 110 can determine from sensor 115 data that the vehicle 105 is on the second road 205 based on determining that a location of the vehicle 105 intersects or has intersected the line J at a junction 210. If the vehicle 105 is on the second road 205, then the process 400 ends. Otherwise, the process 400 returns to the block 435.

In the block 445, the vehicle computer 110 activates the deactivated assist feature(s) from the disabled state to an enabled state. In other words, the vehicle computer 110 can operate the vehicle 105 based on the assist feature(s), i.e., to initiate one or more assist features to supplement or assists the user operation of the vehicle 105 in the through lane 203t. The process 400 continues in a block 455.

In the block 450, the vehicle computer 110 maintains the assist features in the enabled state. That is, the vehicle computer 110 operates the vehicle 105 on the current road 200 based on the appropriate or desirable assist feature(s) for the current road 200. The process 400 continues in the block 455.

In the block 455, the vehicle computer 110 determines whether the vehicle 105 remains on the current road 200 beyond the junction 210. For example, the vehicle computer 110 can determine that the vehicle 105 remains on the current road 200 based on the location of the vehicle 105 being within the geo-fence for the current road 200. Additionally, the vehicle computer 110 can compare the location of the vehicle 105 to the line J to determine that the vehicle 105 is on the current road 200 and beyond the line J, i.e., the junction 210 is behind the vehicle 105. If the vehicle 105 is operating on the current road 200 beyond the junction 210, then the process 400 ends. Otherwise, the process 400 returns to the block 425.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. The adjectives "first," "second," "third," and "fourth," are used throughout this document as identifiers and are not intended to signify importance or order. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
    determine that a current lane of vehicle operation is branched at a location into a through lane and a deceleration lane based on first sensor data indicating an increased width of the current lane exceeding a predetermined width at the location;
    then determine the vehicle is operating in one of (a) the deceleration lane, or (b) the through lane, based on second sensor data; and
    then, one of (a) activate an assist feature of the vehicle to a disabled state based on determining the vehicle is in the deceleration lane, or (b) maintain the assist feature of the vehicle in an enabled state based on determining the vehicle is in the through lane;
    wherein the instructions further include at least one of (a) instructions to, upon determining that the vehicle has moved from the deceleration lane to the through lane, activate the assist feature to the enabled state, or (b) instructions to prevent activation of the assist feature to the enabled state based on determining the vehicle is in the deceleration lane.

2. The system of claim 1, wherein the instructions further include instructions to identify a junction of a road and a current road of vehicle operation based on the junction being within a specified distance of the vehicle.

3. The system of claim 2, wherein the instructions further include instructions to determine that the current lane is branched into the through lane and the deceleration lane based further on identifying the junction.

4. The system of claim 2, wherein a distance from the location to the junction is less than the specified distance.

5. The system of claim 2, wherein the instructions further include instructions to, upon determining a curvature of the road, activate the assist feature to the disabled state based further on the curvature being greater than a threshold curvature.

6. The system of claim 5, wherein the instructions further include instructions to prevent activation of the assist feature to the enabled state based on the curvature of the road being greater than the threshold curvature.

7. The system of claim 5, wherein the instructions further include instructions to determine the curvature of the road based on at least one of map data and vehicle sensor data.

8. The system of claim 2, wherein the instructions further include instructions to prevent activation of the assist feature to the enabled state based on a type of the road.

9. The system of claim 1, wherein the instructions further include instructions to verify the vehicle is operating in one of the deceleration lane or the through lane based on a confidence estimate being above a threshold.

10. The system of claim 9, wherein the instructions further include instructions to determine the confidence estimate based on the second sensor data.

11. The system of claim 1, wherein the instructions further include instructions to operate the vehicle based on the assist feature when the assist feature is in the enabled state.

12. The system of claim 11, wherein the instructions further include instructions to adjust at least one of a speed of the vehicle and a distance between the vehicle and another vehicle based on the assist feature.

13. A method comprising:
    determining that a current lane of vehicle operation is branched at a location into a through lane and a deceleration lane based on first sensor data indicating an increased width of the current lane exceeding a predetermined width at the location;
    then determining the vehicle is operating in one of (a) the deceleration lane, or (b) the through lane, based on second sensor data; and
    then, one of (a) activating an assist feature of the vehicle to a disabled state based on determining the vehicle is in the deceleration lane, or (b) maintaining the assist feature of the vehicle in an enabled state based on determining the vehicle is in the through lane;
    wherein the method further comprises at least one of (a) upon determining that the vehicle has moved from the deceleration lane to the through lane, activating the assist feature to the enabled state, or (b) preventing activation of the assist feature to the enabled state based on determining the vehicle is in the deceleration lane.

14. The method of claim 13, further comprising identifying a junction of a road and a current road of vehicle operation based on the junction being within a specified distance of the vehicle.

15. The method of claim 14, further comprising determining that the current lane is branched into the through lane and the deceleration lane based further on identifying the junction.

16. The method of claim 14, further comprising, upon determining a curvature of the road, activating the assist feature to the disabled state based further on the curvature being greater than a threshold curvature.

17. A system, comprising a computer including a processor and a memory, the memory storing instructions executable by the processor to:
    determine that a current lane of vehicle operation is branched at a location into a through lane and a deceleration lane based on first sensor data indicating an increased width of the current lane exceeding a predetermined width at the location;
    then determine the vehicle is operating in one of (a) the deceleration lane, or (b) the through lane, based on second sensor data;
    identify a junction of a road and a current road of vehicle operation based on the junction being within a specified distance of the vehicle; and
    then, one of (a) activate an assist feature of the vehicle to a disabled state based on determining the vehicle is in the deceleration lane and that the curvature being greater than a threshold curvature, or (b) maintain the assist feature of the vehicle in an enabled state based on determining the vehicle is in the through lane.

18. The system of claim 17, wherein the instructions further include instructions to, upon determining that the vehicle has moved from the deceleration lane to the through lane, activate the assist feature to the enabled state.

19. The system of claim 17, wherein the instructions further include one or more of instructions to:
(a) upon determining a curvature of the road, activate the assist feature to the disabled state based further on the curvature being greater than a threshold curvature,
(b) prevent activation of the assist feature to the enabled state based on the curvature of the road being greater than the threshold curvature, or
(c) determine the curvature of the road based on at least one of map data and vehicle sensor data.

20. The system of claim 17, wherein the instructions further include instructions to prevent activation of the assist feature to the enabled state based on determining the vehicle is in the deceleration lane.

* * * * *